United States Patent [19]

Fujioka

[11] Patent Number: 4,609,960
[45] Date of Patent: Sep. 2, 1986

[54] ROTARY THIN FILM MAGNETIC HEAD DEVICE

[75] Inventor: Yoshiharu Fujioka, Yamato, Japan

[73] Assignee: Tokyo Shibaura Denki Kabushiki Kaisha, Kawasaki, Japan

[21] Appl. No.: 516,957

[22] Filed: Jul. 25, 1983

[30] Foreign Application Priority Data

Jul. 30, 1982 [JP] Japan .................. 57-133543

[51] Int. Cl.$^4$ .................. G11B 5/52; G11B 21/04; G11B 5/16
[52] U.S. Cl. .................. 360/108; 360/107; 360/126
[58] Field of Search .................. 360/84, 110, 125, 126, 360/107, 108

[56] References Cited

U.S. PATENT DOCUMENTS

| | | | |
|---|---|---|---|
| 3,908,194 | 9/1975 | Romankiw | 360/125 |
| 4,315,291 | 2/1982 | Lazzari | 360/125 |
| 4,318,146 | 3/1982 | Ike et al. | 360/84 |
| 4,353,102 | 10/1982 | Kanai et al. | 360/126 |
| 4,383,284 | 5/1983 | Isshiki | 360/125 |
| 4,476,509 | 10/1984 | Konishi et al. | 360/125 |
| 4,509,084 | 4/1985 | Fujioka et al. | 360/110 |

FOREIGN PATENT DOCUMENTS

| | | |
|---|---|---|
| 3016105 | 6/1980 | Fed. Rep. of Germany . |
| 54-72512 | 5/1979 | Japan . |
| 56-159832 | 12/1981 | Japan . |

Primary Examiner—Robert S. Tupper
Assistant Examiner—Melissa J. Koval
Attorney, Agent, or Firm—Oblon, Fisher, Spivak, McClelland & Maier

[57] ABSTRACT

Joining end faces of semicircular magnetic rotor halves are adhered to form a disc-shaped rotor. Magnetic heads are formed at two ends of one of the joining end faces. A magnetic head core and a coil pattern for exciting the core of each of the magnetic heads are formed by alternately depositing magnetic films, insulating films or nonmagnetic conductive films in accordance with thin-film formation techniques. A groove having a triangular cross section is formed at an intermediate portion between the magnetic heads along the thickness of the given rotor half. The center of rotation of the rotor is defined by the groove. Therefore, the line connecting the distal ends of the gaps of the magnetic heads passes through the center of rotation of the rotor and a middle point of the line precisely coincides with the center of rotation. A pair of rotor coil patterns are formed on an upper surface of the rotor to be concentric with the center of rotation in accordance with thin-film formation techniques. These rotor coil patterns serve as rotors of a rotary transformer. Each rotor coil pattern is connected to the corresponding magnetic head through connecting conductors formed on one of the joining end faces in accordance with the thin-film formation techniques.

11 Claims, 15 Drawing Figures

ROTARY THIN FILM MAGNETIC HEAD DEVICE

BACKGROUND OF THE INVENTION

The present invention relates to a rotary magnetic head device having a pair of thin-film magnetic heads and, more particularly, to a compact, light-weight rotary magnetic head device suitable for a video tape recorder (hereinafter abbreviated as VTR).

In the VTR, in general, a rotary magnetic head device is used. A rotary magnetic head device comprises a pair of cylinders facing each other at an interval and forming a chamber therebetween; a rotating shaft projecting into the cylinders substantially coaxial with the cylinders; a rotor having a pair of magnetic heads each having a gap of a predetermined length at the end thereof and mounted on the shaft in the chamber of the cylinders; and a rotary transformer for coupling the magnetic heads to an external circuit.

Figure 1:
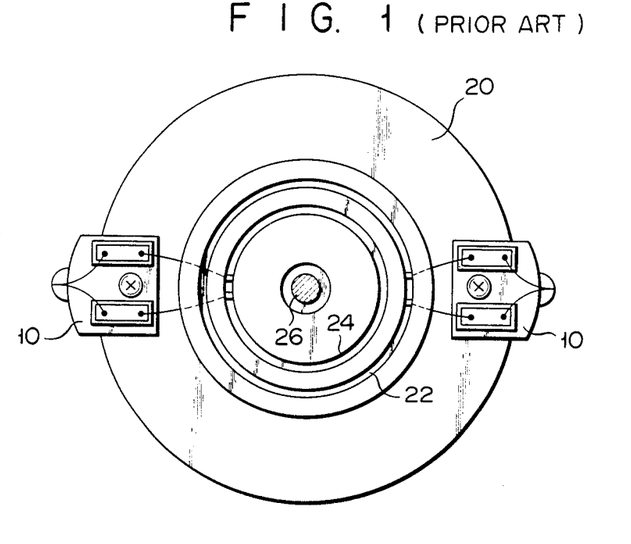
FIG. 1 is a plan view of a conventional rotary magnetic head device.
Figure 2:
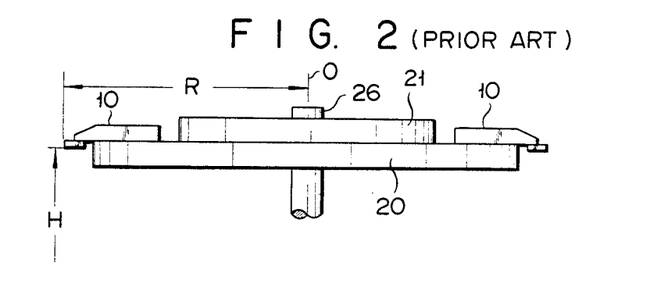
FIG. 2 is a side view of the device shown in FIG. 1.
Figure 3:
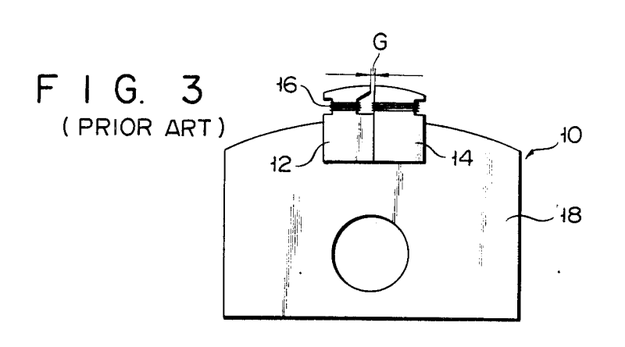
FIG. 3 is an enlarged plan view of a magnetic head of the device shown in FIG. 1.

FIG. 1 is a plan view of a conventional rotary magnetic head device; FIG. 2 is a side view thereof; and FIG. 3 is an enlarged plan view of a magnetic head. Each of the magnetic heads 10 has: a pair of magnetic cores 12 and 14 made of a magnetic material such as ferrite or sendust, the magnetic cores 12 and 14 opposing each other so as to define a gap G therebetween; windings 16 wound around the distal end portions of the cores 12 and 14, respectively; and a metal base plate 18 on which the cores 12 and 14 are mounted. A rotating shaft 26 is fitted in a rotor 20 to be fixed thereby. The magnetic heads 10 are disposed on a line passing through an axis of the rotating shaft 26 such that their tape contact surfaces face outward with respect to the rotor 20. The magnetic heads 10 are located at substantially the same distance R with respect to the center of rotation of the rotating shaft 26, and are bolted on a surface of the rotor 20. Rotor core 21 of the rotary transformer is mounted on the rotor 20. Two annular grooves are formed on this surface of the rotor core 21 to be concentric with the center of rotation of the rotating shaft 26. Coils 22 and 24 are embedded in these annular grooves, respectively. The coils 22 and 24 serve as the rotor of the rotary transformer. The magnetic heads 10 are connected to the coils 22 and 24, respectively.

In the conventional magnetic head device, the distal ends of the magnetic heads 10 at the sides of their gaps are each spaced apart by the distance R from the center O of rotation of the rotor 20. The magnetic heads 10 must be mounted on the rotor 20 such that the line connecting the distal ends passes through the center of rotation O of the rotor. For this reason, the positions of the magnetic heads 10 relative to the rotor 20 must be finely adjusted on the order of several microns or less when the magnetic heads 10 are bolted on the rotor 20. Precision work calling for skill and concentration using a microscope is required to properly align the heads 10 with the rotor 20. Furthermore, two annular grooves of the rotor core 21 of the rotary transformer and two annular grooves of the stator core of the rotary transformer (not shown) fixed on the cylinder must face each other precisely with a constant gap between the stator core and the rotor core. For this reason, two annular grooves must be precisely formed at predetermined positions of the rotor core 21, resulting in cumbersome, time-consuming work. In addition to the complex operation described above, the magnetic heads 10 must be respectively connected to the coils 22 and 24 by soldering or bonding of lead wires. This work leads to a further complex process in manufacturing the rotary magnetic head device.

On the other hand, there has recently arisen a demand for the development of a video camera having a built-in magnetic recording section within a camera section. In order to achieve this, the magnetic recording section, and hence, the rotary magnetic head device, must be made compact. Therefore, the distance between the center of rotation of the rotating shaft and the distal end of the magnetic head 10 must be less than 40 mm. However, it is very difficult to obtain such a compact structure in a magnetic head device wherein conventional magnetic heads 10 are bolted on the rotor 20.

SUMMARY OF THE INVENTION

It is an object of the present invention to provide a rotary magnetic head wherein the center of rotation of a rotor is precisely aligned with the middle point between the distal ends of the gaps of magnetic heads and the line connecting the distal ends passes through the center of rotation O of the rotor without requiring highly precise adjustment.

It is another object of the present invention to provide a compact, light-weight rotary magnetic head device.

It is still another object of the present invention to provide a rotary magnetic head device wherein annular grooves of the rotor core of a rotary transformer are precisely aligned with annular grooves of the stator core of a rotary transformer thereof.

It is still another object of the present invention to provide a rotary magnetic head device which is easy to assemble and manufacture with high precision.

It is still another object of the present invention to provide a rotary magnetic head device suitable for a video camera having a built-in magnetic recording section in a camera section.

According to the present invention, there is provided a rotary magnetic head device having a magnetic rotor and a rotating means for driving the rotor around the center of rotation thereof. The rotor has first and second rotor halves. The first and second rotor halves have first and second joining end faces, respectively, which are joined to each other to constitute the rotor. The rotor has a centering means disposed at the center of rotation thereof to regulate the position of the center of rotation. A magnetic head is formed at each end of the first joining end face. Each of these magnetic heads comprises a thin-film magnetic core, a thin-film coil pattern energized to excite the core, and a gap formed at the end of the core. The magnetic heads slidably contact a recording medium so as to write or read a signal on or from the recording medium when they are driven by the rotary means.

According to the present invention, the position of the center of rotation of the rotor is controlled by the centering means. The magnetic heads are respectively formed at predetermined positions of the rotor with high precision in accordance with thin-film formation techniques. Therefore, a line connecting the distal ends of the gaps of the magnetic heads passes through the center of rotation, and the distances between the distal ends of the gaps of the magnetic heads and the center of rotation are equal to each other. Furthermore, the magnetic heads are formed integrally with the rotor in accordance with the thin-film formation techniques. For this reason, complex, time-consuming alignment between the magnetic heads and the rotor can be eliminated, and a compact rotary magnetic head device can be obtained. In addition to these advantages, the device can be easily assembled and mass-produced.

DETAILED DESCRIPTION OF THE PREFERRED EMBODIMENTS

A rotary magnetic head device according to a first embodiment of the present invention is shown in FIGS. 4 to 7. A disc-shaped rotor 30 has semicircular rotor halves 32 and 34 made of a magnetic material such as ferrite, sendust or permalloy. The respective joining end faces of the rotor halves 32 and 34 have a rectangular shape. These joining end faces are adhered together by a glass adhesive or the like, thereby constituting the disc-shaped rotor 30.

Figure 4:
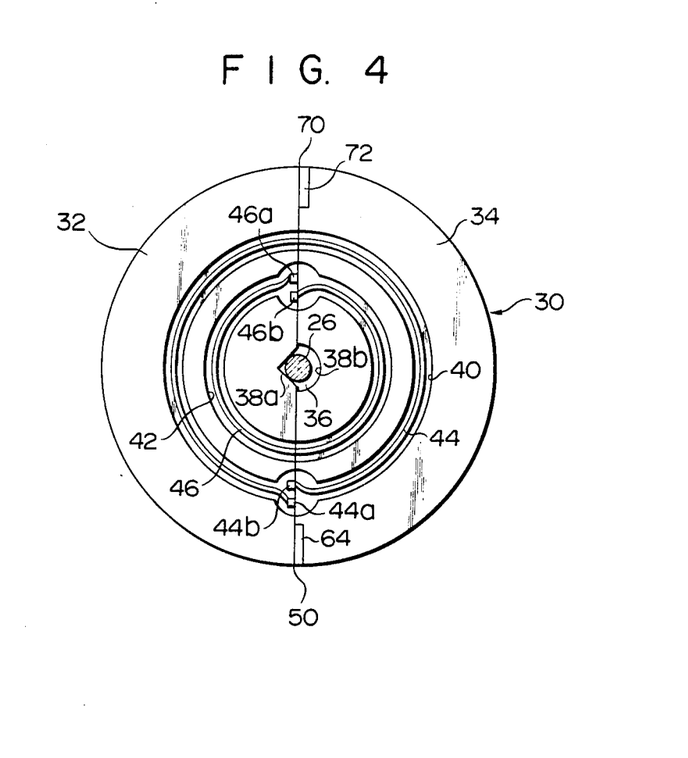
FIG. 4 is a plan view of a rotary magnetic head device according to an embodiment of the present invention.
Figure 5:
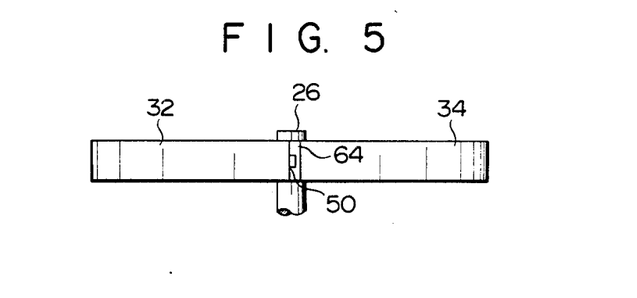
FIG. 5 is a side view of the device shown in FIG. 4.

A pair of magnetic heads 50 and 70 (to be described later) are provided one at each end of the adhered joining end faces of the rotor halves 32 and 34 such that the middle point between the distal ends of the gaps of the magnetic heads 50 and 70 coincides with the center of rotation of the rotor 30. A centering hole 36 is formed at the center of the rotor 30. The centering hole 36 is constituted by: a position-regulating groove 38a formed in the center of the joining end face of the rotor half 32 extending along the thickness thereof; and a clearance groove 38b formed at the center of the joining end face of the rotor half 34 along the thickness thereof. The position regulating groove 38a has a triangular cross section, and the clearance groove 38b has a semicircular cross section. A rotating shaft 26 of a drive mechanism (not shown) for driving the rotor 30 is fitted in the centering hole 36. The groove 38a is formed such that the center of the rotor 30 coincides with the center of the rotating shaft 26 when the outer surface of the rotating shaft 26 is in contact with both walls of the groove 38a. When the rotor 30 is rotated while the rotating shaft 26 is in contact with the groove 38a, the center of the rotor 30 is precisely aligned with the center of rotation (the center of the rotating shaft 26).

Annular grooves 40 and 42 are formed on the upper surface of the rotor 30 to be concentric with the center of the rotor 30, as shown in FIG. 4. The grooves 40 and 42 may be formed, for example, by electric-discharge machining or plasma etching. Annular coil patterns 44 and 46 made of a nonmagnetic conductive material are respectively formed in the grooves 40 and 42 by thin-film formation techniques so as to serve as rotors of the rotary transformer. The coil patterns 44 and 46 are divided at the joining end face portions of the rotor halves 32 and 34, respectively. The ends of the coil patterns 44 and 46 are respectively connected to the magnetic heads 50 and 70 in a manner to be described later.

The magnetic head 50 will be described in detail with reference to FIG. 6. The magnetic head 50 is formed at one end of the joining end face 48 of the rotor half 32 along the longitudinal direction thereof. The magnetic head 50 is formed by thin-film formation techniques. The magnetic head 50 has a pair of magnetic cores 52 and 54 and a coil pattern 58 for exciting the magnetic cores 52 and 54. The magnetic cores 52 and 54 are made of a magnetic material such as permalloy or sendust. The coil pattern 58 is made of a nonmagnetic conductive material. The core 52 is formed nearly at the center of the joining end face 48 in the direction of the width thereof (in the direction of thickness of the rotor 30) and has a sheet-like shape extending along the longitudinal direction thereof. If the thickness of the rotor 30 is set between 200 $\mu$m and 300 $\mu$m, the width of the core 52 can be set at about 30 $\mu$m. An insulating material is deposited on the core 52 and the joining end face 48 to a predetermined thickness such that an insulating film 56 covers the surface of the core 52 and a surface portion of the joining end face 48 which does not have the core 52 thereon. The coil pattern 58 is formed on the insulating film 56 to a predetermined thickness in accordance with the thin-film formation techniques. The coil pattern 58 has a U-shaped structure wherein a cross portion 58c crosses the core 52 at right angles and a pair of lead portions 58a and 58b respectively extending from the two ends of the cross portion 58c toward the center of rotation of the rotor 30 along the longitudinal direction of the joining end face 48. An insulating film 60 is formed on the coil pattern 58. The core 54 is formed on the core 52 over the cross portion 58c interposed therebetween. The core 54 is deposited after removing a portion of the insulating film 56 which is formed on the core 52 closer to the center of rotation of the rotor 30 than the cross portion 58c. Therefore, the core 54 is magnetically connected to the core 52 at this portion. The insulating film 56 is sandwiched between regions of the cores 52 and 54, which are closer to the edge of the joining end face 48 than the cross portion 58c. A gap G of the magnetic head 50 is determined by the thickness of the insulating film 56. The insulating film 56, the cross portion 58c and the insulating film 60 are sandwiched between the cores 52 and 54 at a portion between the cross portion 58c and the core 54 corresponding to the cross portion 58c of the coil pattern 58. Therefore, the coil pattern 58 can be energized while it is insulated from the cores 52 and 54. Using a magnetic film, an insulating film, and a nonmagnetic conductive film of these patterns, the magnetic head 50 is formed such that the one-turn coil pattern 58 is wound around the cores 52 and 54. When the coil pattern 58 is divided into a plurality of portions at the cross portion 58c along the width thereof so as to electrically insulate the plurality of portions from each other, or when a plurality of the nonmagnetic conductive film and the insulating film are alternately formed, a magnetic head can be obtained which has a coil with a plurality of turns. In the same manner as in the magnetic head 50, the magnetic head 70 is formed at the other end of the joining end face 48 of the rotor half 32 in accordance with the thin-film formation techniques.

Figure 7:
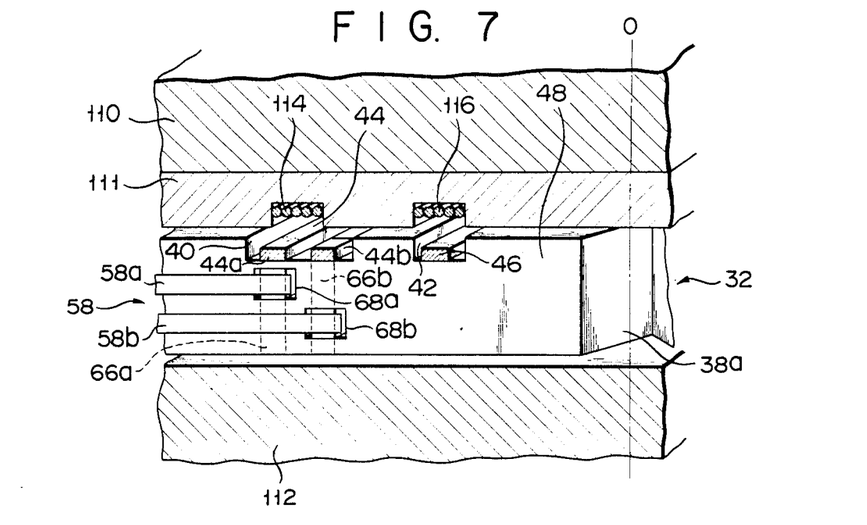
FIG. 7 is a cutaway enlarged perspective view of a conduction portion of the device shown in FIG. 4.

As shown in FIG. 7, the lead portions 58a and 58b of the coil pattern 58 extend to the groove 40, and hence to the coil pattern 44 formed therein. In a position (of the joining end face 48 of the rotor half 32) matching the coil pattern 44, a groove is formed to extend along the width (in the direction of thickness of the rotor half 32) of the joining end face 48. A conductive material is embedded therein to constitute connecting conductors 66a and 66b. The connecting conductors 66a and 66b are electrically connected to a pair of end portions 44a and 44b of the coil pattern 44, respectively. The insulating film 56 described above is formed over the connecting conductors 66a and 66b and the joining end face 48. The lead portions 58a and 58b of the coil pattern 58 are formed on the insulating film 56. A portion of the insulating film 56 which corresponds to an intersection between the lead portion 58a and the connecting conductor 66a is removed to constitute a connecting portion 68a. Similarly, a portion of the insulating film 56 which corresponds to an intersection between the lead portion 58b and the connecting conductor 66b is removed to constitute a connecting portion 68b. The lead portion 58a is electrically connected to the connecting conductor 66a at the connecting portion 68a. Similarly, the lead portion 58b is electrically connected to the connecting conductor 66b at the connecting portion 68b.

Lead portions 74a and 74b of a coil pattern 74 of the magnetic head 70 are electrically connected through connecting portions 78a and 78b to connecting conductors 76a and 76b (FIG. 9) formed on the joining end face 48 of the rotor half 32, respectively. The connecting portions 78a and 78b are connected to a pair of end portions 46a and 46b of the coil pattern 46 formed on the upper surface of the rotor 30, respectively. Therefore, the magnetic heads 50 and 70 are electrically connected to the coil patterns 44 and 46, respectively.

Rectangular nonmagnetic members 64 and 72 are formed at two ends along the joining end face of the rotor half 34 such that the surfaces of the members 64 and 72 are aligned with the joining end face of the rotor half 34. The joining end faces of the rotor halves 32 and 34 are adhered by a glass or organic adhesive 62 (FIG. 6). The nonmagnetic members 64 and 72 are located at positions respectively matching those of the thin-film magnetic heads 50 and 70, when the rotor halves 32 and 34 are adhered to constitute the disc-shaped rotor 30. The magnetic fluxes corresponding to recording signals from the magnetic heads 50 and 70 cannot be short-circuited by the nonmagnetic members 64 and 72 through the rotor halves 32 and 34, thereby preventing degradation of frequency characteristics of the magnetic heads 50 and 70.

The distal end faces of the nonmagnetic members 64 and 72 and the magnetic heads 50 and 70 are even with the outer surface of the rotor 30. As shown in FIG. 7, disc-shaped upper and lower cylinders 110 and 112 are disposed above and below the rotor 30 to be spaced apart thereby. The upper and lower cylinders 110 and 112 are fixed on the main body of the device. Stator core 111 of the rotary transformer is mounted in the lower surface of the upper cylinder 110. Coils 114 and 116 are mounted in the lower surface of the stator core 111 so as to respectively correspond to the coil patterns 44 and 46. These coils 114 and 116 serve as the stators of the rotary transformer. The rotary transformer is constituted by the coil patterns 44 and 46 and the coils 114 and 116. The coil pattern 44 can be magnetically coupled to the coil 114. Similarly, the coil pattern 46 can be magnetically coupled to the coil 116. Therefore, signal transmission/reception upon motion of the magnetic heads 50 and 70 is magnetically performed by magnetic coupling between the coil 114 and the coil pattern 44 and between the coil 116 and the coil pattern 46. The outer peripheries of the upper and lower cylinders 110 and 112 comprise a tape contact surface. The diameter of the tape contact surface is slightly smaller than that of the rotor 30.

In the rotary magnetic head device having the construction described above, a magnetic tape (not shown) is fed along the outer surfaces of the upper and lower cylinders 110 and 112 and is helically wound by a length corresponding to about half of one revolution of the cylinder. The rotor 30 is rotated about the rotating shaft 26 at a peripheral speed higher than the travelling speed of the magnetic tape. The signal to be recorded on the magnetic tape is supplied to the stator coil 114 or 116 of the upper cylinder 110. This signal is supplied to the coil pattern 44 or 46 in accordance with the magnetic coupling between the coil 114 and the rotor coil pattern 44 of the rotor 30 or between the coil 116 and the rotor coil pattern 46 of the rotor 30. When the magnetic tape slidably contacts the magnetic head 50, the signal applied to the coil pattern 44 is supplied to the lead portions 58a and 58b of the coil pattern 58 respectively through the connecting conductors 66a and 66b, thereby flowing a signal current in the cross portion 58c. The cores 52 and 54 are then excited, so that the signal is magnetically recorded on the magnetic tape at the gap of the distal end of the magnetic head 50. When the magnetic tape slidably contacts the magnetic head 70, the signal applied to the coil pattern 46 is supplied to the cross portion 74c through the connecting conductors 76a and 76b and the lead portions 74a and 74b. The magnetic head 70 is excited by this signal current, thereby magnetically recording the signal on the magnetic tape.

Since the rotor 30 is rotated in the condition that the peripheral surface of the rotating shaft 26 contacts the position regulating groove 38a, the center of the rotor 30 is aligned with the center of rotation with high precision. In addition to this advantage, the thin-film magnetic heads 50 and 70 are respectively formed at predetermined positions of the rotor 30 in accordance with the thin-film formation techniques. Therefore, the line connecting the distal ends of the gaps of the magnetic heads 50 and 70 passes through the center of rotation, so that the distances between the distal ends of the gaps of the magnetic heads 50 and 70 and the center of rotation may be set to be equal to each other with high precision. Furthermore, the magnetic heads 50 and 70 are formed integrally with the rotor 30. Therefore, fine adjustment for head alignment after the magnetic heads are mounted on the rotor need not be performed. For this reason, a compact rotary magnetic head device can be easily manufactured.

The rotor coil patterns 44 and 46 are formed on the surface of the rotor 30 in accordance with the thin-film formation techniques. Therefore, the rotor coil patterns 44 and 46 can be respectively formed at predetermined positions of the rotor 30 with high precision. As a result, the rotor coil patterns 44 and 46 can be precisely aligned with the stator coils 114 and 116, respectively. The connection between the coil pattern 44 and the magnetic head 50 or between the coil pattern 46 and the magnetic head 70 can be performed through the connecting conductors 66a and 66b and the lead portion 58a and 58b or through the connecting conductors 76a and 76b and the lead portions 74a and 74b, respectively. It should be noted that the connecting conductors 66a and 66b or 76a and 76b and the lead portions 58a and 58b or 74a and 74b are formed on the joining end face of the rotor half 32 or 34 in accordance with the thin-film formation techniques. Therefore, soldering or bonding of the lead wires need not be performed to connect each magnetic head and the corresponding coil pattern at the time of assembly of the rotary magnetic head device. Therefore, the magnetic head 50 or 70 is easily and properly connected to the coil pattern 44 or 46, providing a variety of industrial applications.

Figure 8:
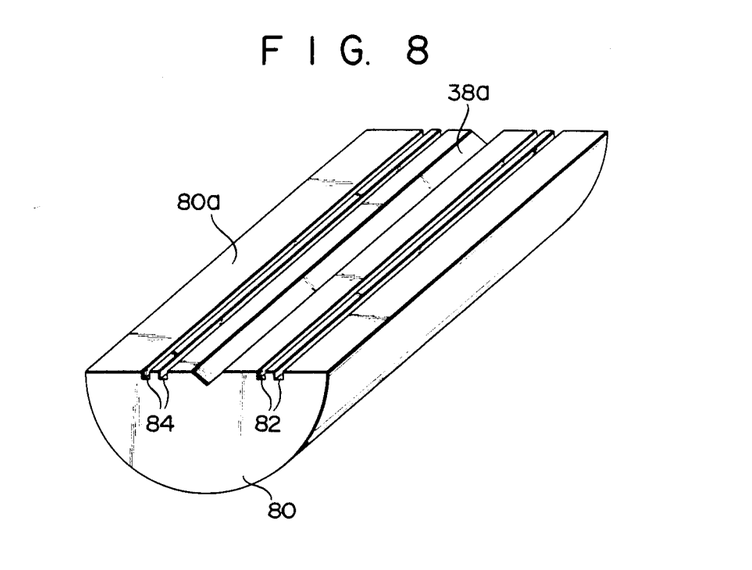
FIG. 8 is a perspective view of a magnetic rod used for manufacturing the rotary magnetic head device.

A method for manufacturing a rotary magnetic head device having the construction described above will be described with reference to FIGS. 8 to 12. As shown in FIG. 8, a semicolumnar magnetic rod 80 is obtained from a magnetic block. A flat surface 80a of the magnetic rod 80 corresponds to the joining end face 48 (FIG. 6), so that lapping or polishing is performed to smoothen the flat surface 80a. The position-regulating groove 38a having a triangular cross section is formed at the center of the flat surface 80a to extend along the longitudinal direction of the magnetic rod 80. Two pairs of grooves 82 and 84 are respectively formed by cutting along two sides of the position-regulating groove 38a to be parallel thereto. The grooves 82 are formed at positions corresponding to those of the connecting conductors 66a and 66b, respectively. Similarly, the grooves 84 are formed at positions corresponding to the connecting conductors 76a and 76b, respectively. The groove 82 or 84 is formed such that the distance between the center of the groove 38a and the inner groove 84 becomes equal to the distance between the stator coil 116 and the center (indicated by the alternate long and short dashed line) of the cylinder 110 (FIG. 7) or such that the distance between the center of the groove 38a and the outer groove 82 becomes equal to the distance between the stator coil 114 and the center of the stator core 111. An insulating film 86 (see FIG. 10) of $SiO_2$ or $Al_2O_3$ is formed by deposition or sputtering on the peripheral portion of the flat surface 80a including the grooves 82 and 84. A nonmagnetic conductive material is embedded in the grooves 82 and 84 so as to respectively form the connecting conductors 66a and 66b and the connecting conductors 76a and 76b. Thereafter, the insulating film 86 on the flat surface 80a is removed.

Figure 9:
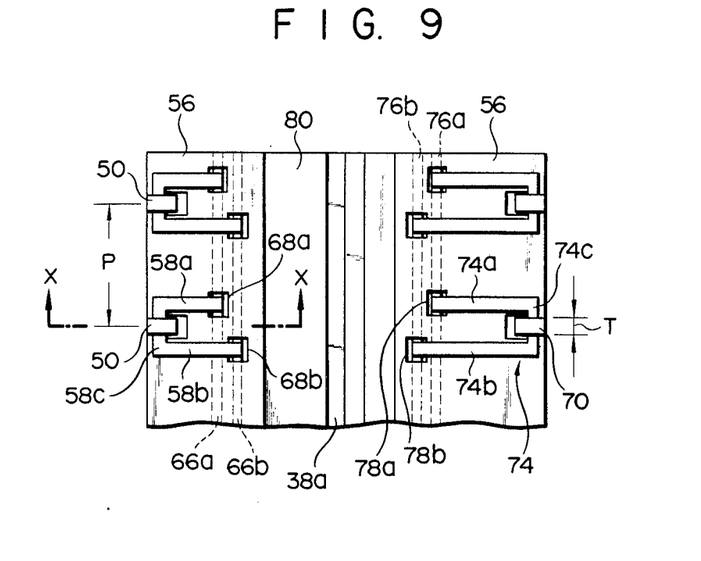
FIG. 9 is a plan view of the magnetic rod shown in FIG. 8.
Figure 10:
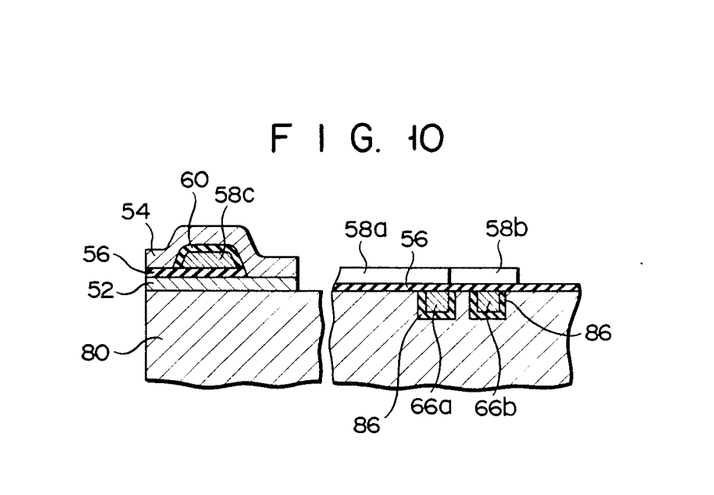
FIG. 10 is a sectional view showing part of the magnetic rod, the view being taken on the plane of the line X—X of FIG. 9.

As shown in FIG. 9, the magnetic heads 50 and 70 are formed on the flat surface 80a at a predetermined pitch P along the magnetic rod 80. In this case, the core 52 which defines a track width T is formed after the insulating film 86 is removed. Therefore, the core 52 is directly formed on the magnetic rod 80 (i.e., the rotor half 32), as shown in FIG. 10 which is a sectional view taken along line X—X of FIG. 9. The insulating film 56, the coil pattern 58, the insulating film 60 and the core 54 are sequentially formed, as shown in FIG. 6. As a result, the magnetic head 50 is formed. The magnetic head 70 is formed in the same manner as is the magnetic head 50. In this case, the line connecting the magnetic heads 50 and 70 is perpendicular to the longitudinal direction of the magnetic rod 80, and they oppose each other.

Figure 6:
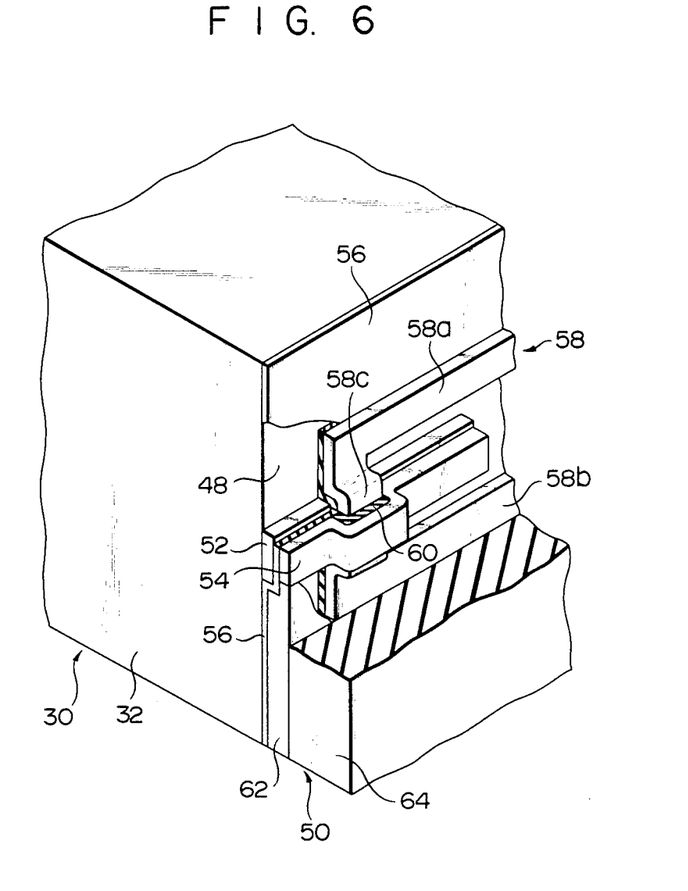
FIG. 6 is a partially cutaway enlarged perspective view of a magnetic head of the device shown in FIG. 4.
Figure 11:
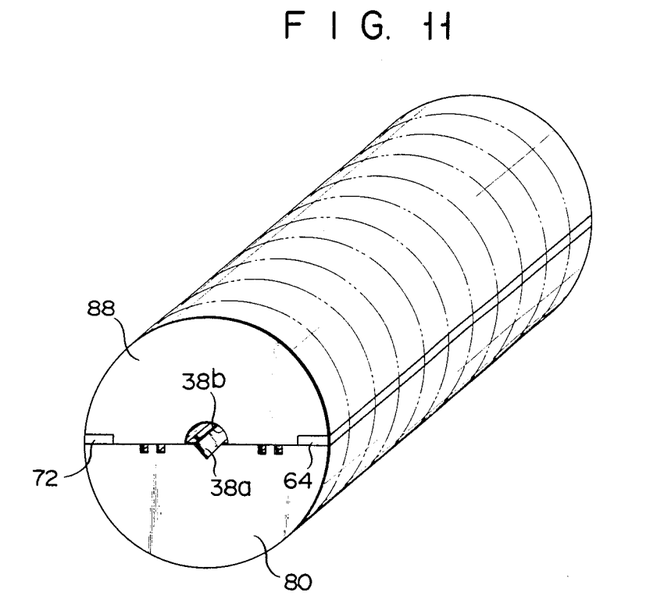
FIG. 11 is a perspective view of the magnetic rod shown in FIG. 8.

As shown in FIG. 11, a semicolumnar magnetic rod 88 is fixed on the magnetic rod 80 such that their flat surfaces are adhered together by the adhesive 62 (FIG. 6). The clearance groove 38b is formed at the center of the flat surface along the magnetic rod 88. The nonmagnetic members 64 and 72 are embedded at two edge portions of the flat surface of the magnetic rod 88.

Figure 12:
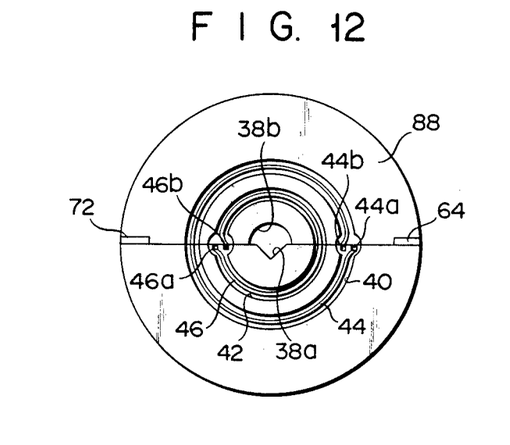
FIG. 12 is a plan view of a disc obtained from the magnetic rod shown in FIG. 11.

The columnar block obtained by adhering the magnetic rods 80 and 88 is cut between adjacent magnetic heads 50 (FIG. 9) at the pitch P to form discs, as indicated by the dotted lines in FIG. 11. The cut surfaces are then polished and smoothened. Subsequently, as shown in FIG. 12, the two annular grooves 40 and 42 are formed by etching the surface of each disc (i.e., the surface of the rotor 30) to be concentric with the center of the rotor 30. The ends of the connecting conductors 66a and 66b are exposed in the groove 40. Similarly, the ends of the connecting conductors 76a and 76b are exposed in the groove 42. As shown in FIGS. 4 and 12, when the coil patterns 44 and 46 are formed in the grooves 40 and 42, respectively, by the film formation technique, the coil pattern 44 is electrically connected to the connecting conductors 66a and 66b and the coil pattern 46 is electrically connected to the connecting conductors 76a and 76b. In this manner, a plurality of rotary magnetic head devices of the present invention are manufactured from a single columnar block.

As described above, the rotary magnetic head device of this embodiment is easily manufactured with high precision by utilizing thin-film formation techniques such as deposition, plating and sputtering. Since the magnetic head can be formed integrally with the rotor, precise, time-consuming head alignment need not be performed. As a result, a compact device can be easily mass-producted.

Figure 13:
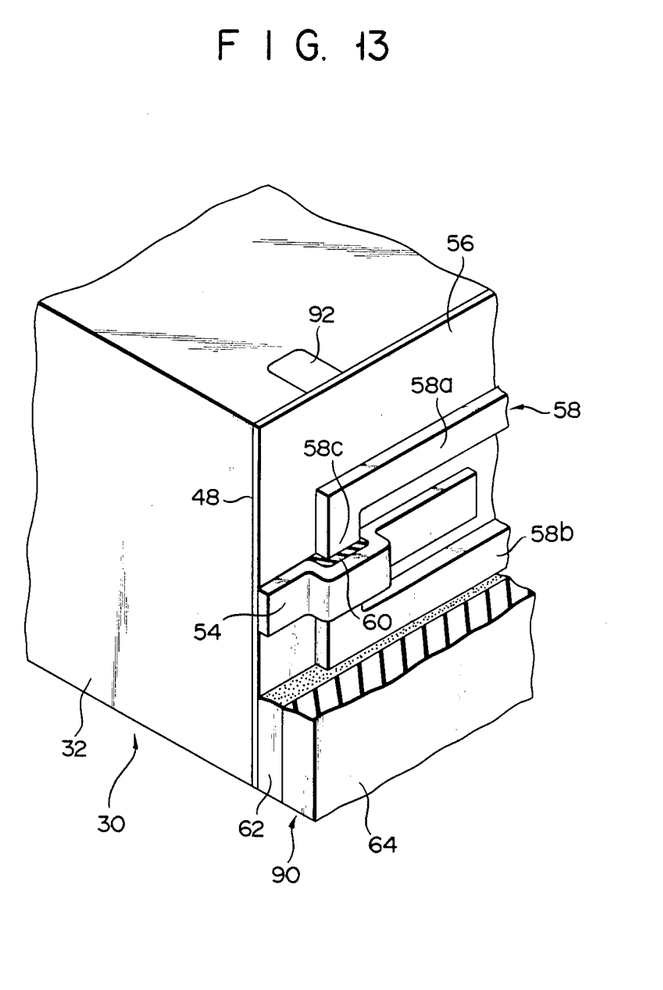
FIG. 13 is a partially cutaway enlarged perspective view of a magnetic head of a rotary magnetic head device according to another embodiment of the present invention.

A rotary magnetic head device according to a second embodiment of the present invention will be described with reference to FIG. 13. The reference numerals used in FIG. 6 denote the same parts in FIG. 13, and a detailed description thereof will be omitted. In this embodiment, the rotor half 32 also serves as a core of a magnetic head 90. The magnetic head 90 has a core 54 and a coil pattern 58. An insulating film 56 is formed on a joining end face 48 of a rotor half 32. A coil pattern 58 of a U-shaped structure is formed on the insulating film 56. The coil pattern 58 has lead portions 58a and 58b and a cross portion 58c. An insulating film 60 is formed at a predetermined central portion of the cross portion 58c. The core 54 is formed on the insulating films 56 and 60 so as to extend substantially at the center of the joining end face 48 along the width direction thereof. In this case, a portion of the core 54 which is closer to the center of rotation of the rotor 30 than the cross portion 58c is formed after a portion of the insulating film 56 corresponding to that portion of the core 54 is removed from the joining end face 48. Therefore, the magnetic core 54 is directly formed on the rotor half 32 at this portion. The insulating film 56 is sandwiched between the distal end of the core 54 which is exposed on the outer surface of the rotor half 32 and a portion of the rotor half 32 which is matched with this distal end. The insulating film 56 constitutes the gap of the core of the magnetic head 90. When a signal current flows in the coil pattern 58, a magnetic flux is formed in the core 54 and in a portion of the rotor half 32 which matches with the core 54. This magnetic flux leaks from the gap of the magnetic head 90, so that the signal is magnetically recorded on the magnetic tape. It is preferable to embed a nonmagnetic member 92 extending at a position (which is aligned with the cross portion 58c) of the joining end face 48 of the rotor half 32 along the depth of the rotor half 32. The magnetic flux cannot leak into the rotor half 32 because of the nonmagnetic member 92. The magnetic path of the magnetic head 90 is formed only at the end corresponding to the distal end of the core 54 of the rotor half 32. As a result, degradation of the recording/reproducing efficiency caused by the magnetic flux leakage is prevented.

Figure 14:
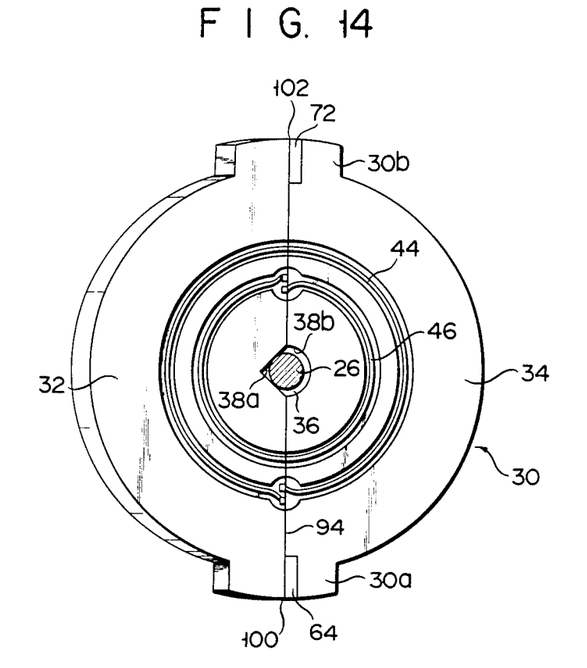
FIG. 14 is a plan view of a rotary magnetic head device according to still another embodiment of the present invention.
Figure 15:
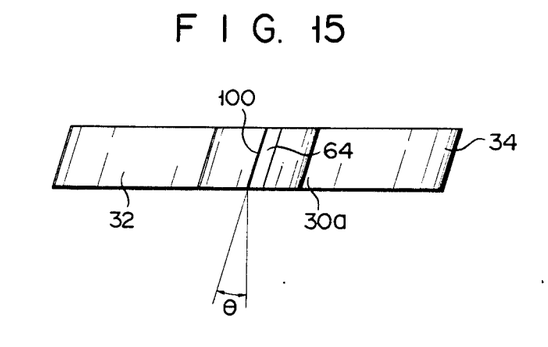
FIG. 15 is a side view of the device shown in FIG. 14.

FIGS. 14 and 15 show a rotary magnetic head device according to a third embodiment of the present invention, in which FIG. 14 is a plan view thereof and FIG. 15 is a front view thereof. This embodiment is concerned with a rotary magnetic head device for azimuth recording. Joining end faces 94 of the rotor halves 32 and 34 of the rotor 30 are inclined by an azimuth angle $\theta$ with respect to a direction perpendicular to the semicircular surfaces thereof. Thin-film magnetic heads 100 and 102 are formed on the joining end face 94 which crosses the semicircular surface of the rotor half 32 by an angle 90° - $\theta$, in the same manner as the magnetic head 50 in FIG. 6. The gap angles of the magnetic heads 100 and 102 differ from each other, so that azimuth recording can be performed using the magnetic heads 100 and 102.

The rotor 30 shown in FIGS. 4 and 12 need not be formed in a disc shape. For example, as shown in FIG. 14, a rotor 30 may be formed such that each portion which corresponds to the magnetic heads 100 and 102 may extend outward. In this case, the rotor 30 may be formed such that the radius of curvature of each of the extended portions 30a and 30b is slightly larger than that of each of the cylinders 110 and 112 (FIG. 7).

In the rotor 30 is made by cutting the magnetic rod shown in FIG. 11, slantwise, it will have an elliptical surface and will not be able to enter the upper cylinder or the lower cylinder. Hence, instead of the magnetic rod shown in FIG. 11, a magnetic rod having a diameter smaller than that of the upper and lower cylinders and having protruding portions which will become magnetic heads 100 and 102 is cut slantwise, thus forming a rotor 30 which can enter either the upper cylinder or the lower cylinder.

What is claimed is:

1. A rotary thin film magnetic head device for recording or reproducing a signal on or from a recording medium, comprising:

a disc-shaped rotor of a magnetic material having first and second semicircular rotor halves and centering means, the first and second halves comprising first and second joining end faces, respectively, which are adhered to each other to constitute the rotor, and the centering means being disposed at the center of rotation of the rotor so as to control the positioning of the rotor's center of rotation;

a pair of magnetic heads formed respectively at two ends of the first joining end face, each of the magnetic heads having a magnetic core film, a coil film pattern energized to drive the magnetic core film, and a gap formed at the distal end of the magnetic core film;

rotating means for driving the rotor around the center of rotation thereof so as to cause the pair of magnetic heads to be in slidable contact with the recording medium; and a rotary transformer for coupling the magnetic heads and an external circuit, the rotary transformer comprising two annular grooves formed on a surface of the rotor to be concentric with the center of rotation; two rotor coil patterns formed respectively in the two annular grooves, one of the two rotor coil patterns having two ends at a contact portion at the first and second joining end faces on one side of the centering means, and the other of the two rotor coil patterns having two ends at a contact portion at the first and second joining end faces on the other side of the centering means; two stator coils spaced apart from the respective rotor coil patterns by a predetermined interval, and connected to the external circuit; two pairs of connecting conductors formed on the first joining end face, each of the pairs of connecting conductors being connected to the two ends of the rotor coil pattern corresponding thereto; and the coil film pattern of each of the magnetic heads having a cross portion crossing the magnetic core films, and two pairs of lead portions extending from opposite ends of the cross portion to the connecting conductors corresponding thereto, one of the pair of lead portions being connected to one pair of the connecting conductors and the other of the pair of lead portions being connected to the other pair of connecting conductors, whereby the signal from the external circuit is transferred to the magnetic heads by magnetic coupling between the stator coils and the rotor coil pattern corresponding thereto.

2. A device according to claim 1, wherein each of the magnetic heads comprises: a first magnetic core film on said first joining and face and which has a distal end aligned with a peripheral edge of the first joining end face; a second magnetic core film formed on the first magnetic core film; a first insulating film sandwiched between regions of the first and second magnetic core films which contain said edge of the first joining end face; a coil film pattern sandwiched between said first and second magnetic core films and extending transverse to said first and second core films so as to cross the first and second magnetic core films; and second insulating films sandwiched between the coil film pattern and the first magnetic core film and between the coil film pattern and the second magnetic core film, the gap being constituted by the first insulating film.

3. A device according to claim 2, wherein each of the magnetic heads has a first nonmagnetic member for magnetically shielding the first and second magnetic core films from the second rotor half.

4. A device according to claim 3, wherein each of the magnetic heads has a second nonmagnetic member for preventing a magnetic flux generated in a portion of the coil film pattern from leaking into the first rotor half, the portion being in the vicinity of the first and second magnetic core films.

5. A device according to claim 1, wherein each of the magnetic heads comprises: a second magnetic core film positioned adjacent said first joining end face and which has a distal end aligned with a peripheral edge of the first joining end face; a first insulating film sandwiched between the first joining end face and a region of the second magnetic core film which contains said edge of the first joining end face, a coil film pattern sandwiched between the second magnetic core film and the first joining end face and extending transverse to said second core film to cross the second magnetic core film; and second insulating films sandwiched between the coil film pattern and the second magnetic core film and between the coil film pattern and the first joining end face, the gap being constituted by the first insulating film.

6. A device according to claim 5, wherein each of the magnetic heads has a first nonmagnetic member for magnetically shielding the second magnetic core film from the second rotor half.

7. A device according to claim 6, wherein each of the magnetic heads has a second nonmagnetic member for preventing a magnetic flux generated in a portion of the coil film pattern from leaking into the first rotor half, the portion being in the vicinity of the second magnetic core film.

8. A device according to claim 1, wherein the rotating means has a rotating shaft, and said centering means has a first groove formed in the first joining end face so as to extend along a thickness of the first rotor half and a second groove formed in the second joining end face so as to align with the first groove and to extend along a thickness of the second rotor half, said rotating shaft being inserted in a hole defined by the first and second grooves.

9. A device according to claim 8, wherein the first groove has a triangular cross section, and the center of rotation of the rotor is defined such that a surface of the rotating shaft contacts a wall of the first groove.

10. A device according to claim 1, wherein the first and second rotor halves are adhered by an adhesive.

11. A device according to claim 1, wherein the gap formed at a distal end of the magnetic core film has a predetermined azimuth angle.

* * * * *